United States Patent [19]

Potet et al.

[11] Patent Number: 4,741,474

[45] Date of Patent: May 3, 1988

[54] PROCESS FOR MANUFACTURING REINFORCED PANEL

[75] Inventors: Henri-Jacques Potet, Le Vesinet; Jean-Claude Vacher, Douai, both of France

[73] Assignee: Asturienne France, Auby-les-Douai, France

[21] Appl. No.: 892,955

[22] Filed: Aug. 4, 1986

[30] Foreign Application Priority Data

Aug. 5, 1985 [FR] France .............................. 85 11959
Feb. 19, 1986 [FR] France .............................. 86 02245

[51] Int. Cl.⁴ .............................................. B23K 1/20
[52] U.S. Cl. ....................................... 228/190; 228/43; 29/455 LM
[58] Field of Search .............. 228/190, 198, 120, 178, 228/227, 228, 229, 232, 43; 29/455 LM; 428/608

[56] References Cited

U.S. PATENT DOCUMENTS

| | | | |
|---|---|---|---|
| 1,243,654 | 10/1917 | Clark | 428/608 X |
| 2,073,334 | 3/1937 | Coffman | 428/608 |
| 2,188,721 | 1/1940 | Whorter et al. | 428/608 X |
| 2,530,552 | 11/1950 | Stoddard | 228/254 |
| 2,694,852 | 11/1954 | Rogers | 228/178 |
| 2,764,808 | 10/1956 | Coffman | 228/259 X |
| 3,620,880 | 4/1969 | Lemelson | 228/190 |

FOREIGN PATENT DOCUMENTS

| | | |
|---|---|---|
| 3401670 | 8/1985 | Fed. Rep. of Germany . |
| 1044517 | 11/1950 | France . |
| 1046798 | 10/1966 | United Kingdom . |

*Primary Examiner*—Kenneth J. Ramsey
*Attorney, Agent, or Firm*—Michael N. Meller

[57] ABSTRACT

Process for manufacturing reinforced panel, including corrosion resistant panel, comprising preheating a galvanized or zinc coated metal sheet, applying a molten aluminum coating to a strip or plate of metal mesh and pressing the thus heated materials together to effect interdiffusion of the zinc and aluminum. An embodiment of the process is characterized by the immersion of the mesh into an aluminum bath and the passing of the molten aluminum coated mesh and galvanized strip between pinch rolls. The molten aluminum coated mesh may also be sandwiched between two zinc coated strips.

6 Claims, 2 Drawing Sheets

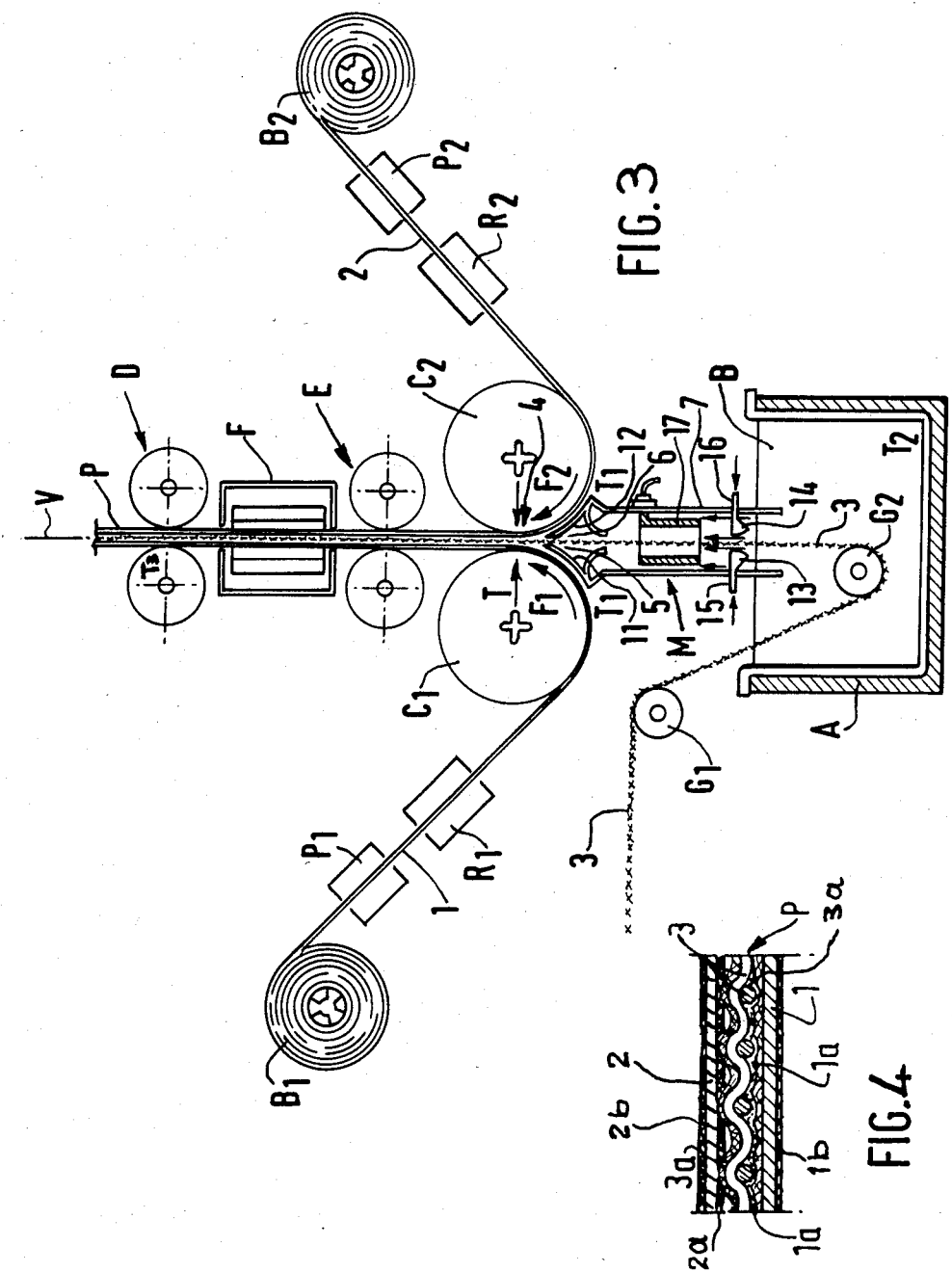

PROCESS FOR MANUFACTURING REINFORCED PANEL

The present invention relates to a process for manufacturing reinforced panel which is protected against corrosion.

Sandwich panels are already known which are constituted by two sheets or plates made either of metal covered with zinc (galvanized sheet or sheet electrically plated with zinc), or aluminum or other metals or protective alloys, confining between the sheets or plates a mesh or wire netting serving for connection, as well as reinforced panels constituted by a single sheet or plate and a mesh or a succession of stacked sheets and mesh layers. Such panels are particularly suitable for metallic constructions which have the task of absorbing vibrations or deformations and of affording a large inertia and a large damping capacity (panels for crates or packing cases, for doors, for motor car bonnets or hoods, for example) as well as having a very high resistance to corrosion.

In the realization of such panels a difficulty is encountered in the connection of the sheet(s) and the mesh. One solution that has been adopted consists of sticking the sheet to the mesh. However, this solution has the major drawback that the adhesive film presents during welding a significant electric and/or thermic resistance, especially during welding of the panels to each other or to a connecting means and, moreover, the process of sticking does not ensure a lasting adhesion between the mesh and the panel.

An object of the present invention is to overcome these drawbacks and to propose reinforced panels which are readily weldable together by electric welding and which afford an enhanced resistance to loosening, notably with time.

A reinforced panel according to the invention constituted by at least one metallic sheet metallized on at least one face by a metal or metallic alloy covering different from that of the sheet and welded on one surface to a connecting mesh is characterised in that the mesh is metallised and welded by way of its metallized covering to the covering of the metallized surface of the sheet. The mesh and the sheet may be metallized on the whole of their surfaces and, according to one mode of carrying out the invention which has proved to be unforeseeably very advantageous, the sheet is metallized with zinc while the mesh is metallized with aluminum, at least on its outermost surface.

The reinforced panel may be constituted by two sheets which have been metallized on at least those faces which are to be connected by the metal or metallic alloy covering and confining between the sheets the mesh to constitute a sandwich panel. In order to produce a reinforced panel with at least two elements, the invention provides a manufacturing process characterized in that at least one strip or plate of sheet metal metallized on at least one face is first heated to a first temperature $T_1$, in that a strip or plate of mesh is previously covered by a weld material and heated to a second predetermined temperature $T_2$, one of the predetermined temperatures $T_1$ or $T_2$ being higher than the temperature of fusion or melting point of the weld material, and in that the assembly of the sheet and the mesh are then compressed with their metallized faces in engaged super-position in such a manner as to assure the welding of the mesh to the sheet by transfer of the heat of the panel element which is the hotter to the other element for simultaneously bringing to the weld temperature the coverings of the sheet and of the mesh and by diffusion of the covering of the mesh into the covering of the sheet and/or vice versa.

According to one more specific mode of performing the process of manufacture of a reinforced panel, at least one strip or plate of sheet metal metallized on at least one face is previously heated to a first temperature $T_1$ which is lower than the melting point or destruction of its metallized covering, a strip-like or plate-like mesh is previously covered with a liquid weld material and heated to a second predetermined temperature $T_2$ which maintains this weld material in a liquid state and then the assembly, constituted by the sheet bearing with its metallized face on the mesh, is compressed in such a manner as to assure the welding of the mesh to the sheet by diffusion of the covering of the mesh into the covering of the sheet and by absorption of heat energy by the sheet and its metallized covering, the heat energy originating from the solidification of the liquid covering of the mesh.

A certain cooling effect is thus obtained which confers a certain coherence or bonding to the panel which has just been welded. In order to improve the resistance of the panel to subsequent mechanical treatments such as rolling, the assembly of the sheet and the mesh may be cooled immediately after their exit from the compression phase to a third temperature $T_3$ at which the weld has hardened.

According to another manner of carrying out the process, a sheet metallized with zinc, preferably by electro-plating with zinc, is utilized, while for the mesh one utilises a metallic weld material of aluminum or aluminum alloy. In order to obtain an improved bonding of the weld material, one may use a mesh which has previously been metallized, particularly with a metal other than the material of the weld, such as zinc.

According to another mode of carrying out the process, the metallized face of at least one plate of sheet metal previously heated to a first temperature $T_1$ is brought into contact with a mesh plate previously immersed in a bath of the liquid weld material, such as a metal or a metallic alloy, brought to a second predetermined temperature $T_2$, by feeding this mesh with a metallic covering and heating it to the weld temperature and then the assembly thus formed is compressed flat, e.g. by means of a press, in such a manner as to assure the welding of the mesh to the sheet.

According to another embodiment of the process, at least one strip or sheet which has been metallized and previously heated to a first temperature $T_1$ is brought into contact in an inert atmosphere with a mesh which has been previously immersed in a bath of a liquid weld material brought to a second predetermined temperature $T_2$ in such a manner as to feed this mesh with the metallic covering and heating it to the weld temperature and then the thus formed assembly is compressed by rolling. Preferably, any excess liquid welding material remaining on the mesh exiting from the bath is eliminated by blowing with an inert gas, such as nitrogen, while maintaining in a liquid state the residual weld material covering of the mesh.

The sheet strips may receive a previous surface treatment which preserves the integrity of their metallization cover and before passing into the liquid weld bath the mesh may receive a suitable treatment.

The process for manufacturing reinforced panels in accordance with the invention is performed by an apparatus which comprises at least one reel delivering a metallized sheet strip, means for the surface treatment of this sheet and for heating it to a first temperature $T_1$ upon leaving the reel, a pair of rolling or calendering or pressing cylinders between which the strip of metal is engaged so that it leaves them along a vertical path, preferably an ascending path, the apparatus further comprising a device for unwinding the mesh in which the latter is guided by rollers for immersion into a liquid weld bath, such as a metal or metallic or alloy bath, maintained at a second predetermined temperature $T_2$ and in which on leaving the bath the mesh is brought into contact with the sheet strip in the cylinders, as well as a rapid cooling means capable of cooling the mesh immediately after its exit from the cylinders to a third temperature $T_3$ at which the weld has hardened or solidified, the panel being formed by compression and welding of the mesh in contact with the sheet.

The rapid cooling means is preferably constituted by blower nozzles blowing cooling air in the direction of the gap between the cylinders from each side of the reinforced panel exiting from the gap between these cylinders.

Advantageously, the mesh is surrounded between its exit from the bath and its entry in between the cylinders by a casing in which an inert gaseous atmosphere prevails and in which blowing means and temperature-maintaining means operate.

Other characteristics, aims and advantages of the invention will appear on reading the following description of a preferred embodiment, given by way of example and not of limitation, with reference to the attached drawings in which:

FIG. 3 shows schematically apparatus according to the invention for making a sandwich panel;

FIG. 4 is a fragmentary section of a sandwich panel according to the invention made with the aid of the apparatus illustrated in FIG. 3.

Figure 1:
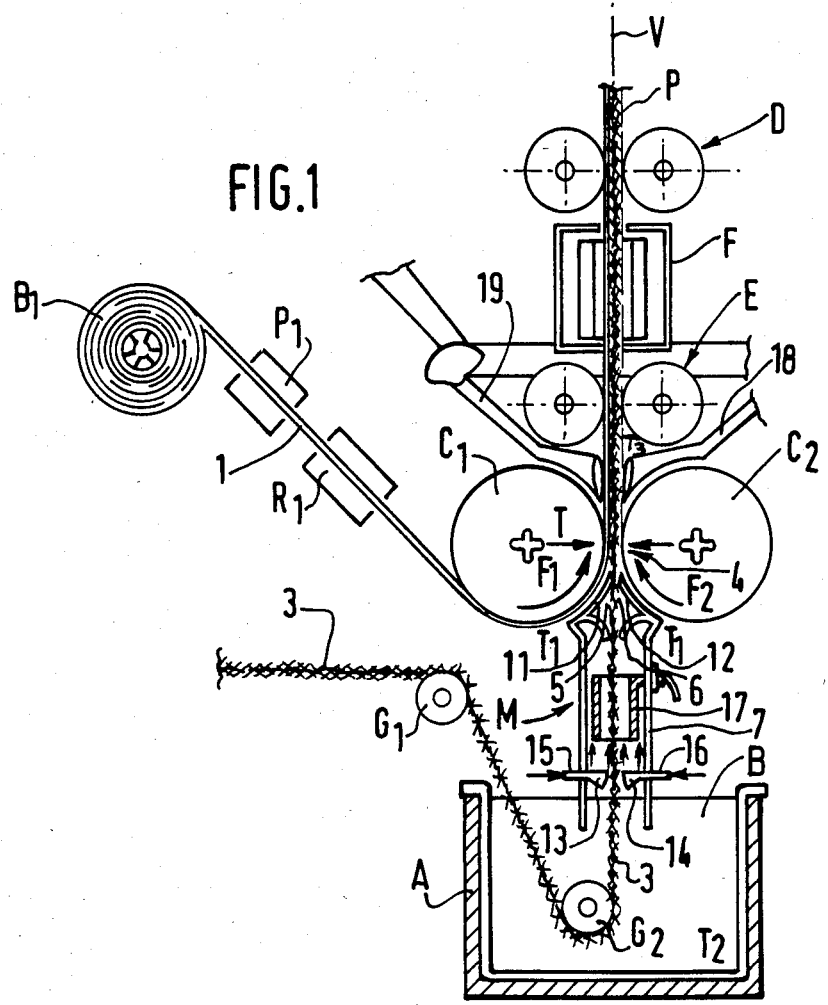
FIG. 1 is a schematic representation of apparatus for carrying out the process and for making a reinforced panel according to the invention.

The apparatus according to the invention, in its embodiment illustrated in FIG. 1, comprises on one side of a vertical plane V a reel $B_1$ with a horizontal axis on which a sheet 1 is wound in the form of a strip the sheet 1 destined to constitute the planar surface of the reinforced panel according to the invention. This sheet is with a metal or a coating alloy such as zinc, by galvanization or zinc-electroplating or, for certain applications, with aluminum, on at least that surface which comes into contact with a reinforcing mesh.

The reel $B_1$ is associated with a block $P_1$ provided to assure in a known manner a mechanical and/or chemical preparation of the surface of the sheet strip, and with a heating unit $R_1$ for bringing the temperature of this strip to a predetermined value $T_1$, normally lower than the fusion temperature or the temperature at which the metallization covering of the sheet is damaged. For a galvanized sheet, i.e., a sheet metallized with zinc, the melting point of which is about 420° C., the temperature $T_1$ is of the order of 300° C.

After being unwound (by means not shown) from the reel $B_1$ and having respectively traversed the surface treatment unit $P_1$ and the heating unit $R_1$, the strip of sheeting 1 is introduced between two compression cylinders $C_1$ and $C_2$ disposed on either side of the central vertical plane V along a vertical ascending path in plane V. At least that surface of the sheeting which is disposed opposite the mesh between the cylinders is metallized.

Non-illustrated and per se known means assure the drive of the cylinders $C_1$ and $C_2$ in opposite senses according to the arrows $F_1$ and $F_2$; other means cause these cylinders to approach each other in order to maintain between them a constant pressure T which according to the applications may cause an actual rolling or flattening of the sheeting and above all of the mesh by reduction of cross-section but more generally a calendering effect, that is to say a flattening or simple squeezing. From a non-illustrated paying-out device, a metallic mesh 3 constituted, for example, by stranded metallic wires and destined to constitute the reinforcement or core of the panel (in the case of a sandwich panel) is guided by guide rollers $G_1$ and $G_2$ and is subjected to a suitable surface treatment. The mesh 3 is immersed into a bath B of liquid metallic material or liquid weld material such as zinc, tin, aluminum, lead, cadmium or a liquid alloy such as an aluminum-copper alloy or an aluminum-silicon alloy in which it is reheated to the temperature $T_2$ which is substantially that of the bath B contained in an insulating enclosure A extending perpendicularly to the plane V. By way of example, in the case where the mesh 3 is immersed into an aluminum bath, the temperature of this bath is in the region of 700° C.

The mesh 3 leaves the bath B according to an ascending vertical path in the plane V and in the gap between the cylinders $C_1$ and $C_2$ it is brought into contact with the sheet 1 in the course of its passage between the cylinders $C_1$ and $C_2$ in a rolling zone 4 or more generally in a squeezing zone, producing a compression by means of squeezing T and welding of the covering metal 3a of this mesh 3 to the covering metal of the sheeting 1 and by way of consequence, the welding of the mesh 3 to the sheeting 1.

In its path between the path B and the cylinders $C_1$ and $C_2$ the mesh 3 is surrounded by a sleeve M, the sealed envelope 7 of which is immersed in the bath B and by way of two upper lips or rims 11 and 12 it matches the lower contour of the cylinders $C_1$ and $C_2$ in order to constitute a nozzle 5 or 6 on each side of the mesh 3 in the form of a gap directed towards the compression zone 4.

Nozzles 13, 14 are disposed within the sleeve M above the bath, the nozzles being each turned towards a particular surface of the mesh and being connected via ducting 15, 16 to a source of inert gas under compression, such as nitrogen. The jets of inert gas escaping from these nozzles have the function of removing excess liquid covering material entrained by the mesh 3 without causing oxidation of the liquid metal. An inert gaseous atmosphere prevails within the interior of the sleeve M as does a controlled temperature which may be regulated by electric heating plates 17. In this case it is necessary to regulate the operating parameters: the blowing, the temperature $T_1$, and the rate of feed in order that the covering of the mesh should remain liquid and at a desired temperature after the blowing. The mesh 3 is brought into contact with the sheeting 1 in the squeeze zone 4 by means of the cylinders $C_1$ and $C_2$. Under the effect of the compression and, in case of need, of rolling, there is an intimate and close contact between the mesh 3 and the sheeting 1 by the intermediation of their respective metallic coverings and welding by diffusion of the metallic covering. Welding is effected by virtue of the fact that the metallic covering $1a$ of the sheeting 1 (see FIG. 2) initially absorbs the heat of solidification of the liquid covering $3a$ of the mesh, which welds the two coverings to each other and thereafter transfers this heat to the sheet 1 itself.

In this way, the sheet 1 and the mesh 3 are instantaneously integrally united by welding. In order to prevent a possible local unwelding or loosening between the sheet 1 and the mesh 3, immediately after the exit from the squeezing zone or range 4 between the cylinders $C_1$ and $C_2$ the assembly constituted by the sheet 1 welded to the mesh 3 may be subjected to a rapid supplementary cooling by blowing nozzles 18 and 19 (for example, by blowing cool air), to a temperature $T_3$ at which the weld hardens. Where the liquid welding material is, for example, zinc, the rapid cooling is to bring the weld to a temperature distinctly inferior to the melting point of zinc, that is, to say, at least 300° C.

One of the combinations which has proved experimentally and in an unforeseeable fashion to be the most favorable consisted in utilizing sheets 1 which have been metallized with zinc by electroplating and a mesh, which has preferably been premetallized (particularly with zinc) in order to obtain better bonding of the liquid metal, the mesh having been immersed in a bath B of molten aluminum. The aluminum, which has a high latent heat of fusion, transfers to the squeezing or rolling zone 4 a high quantity of heat which facilitates the diffusion welding of the metal of the metallization layer $1a$ of the sheet 1 into the covering metal layer $3a$ of the mesh 3.

Figure 2:
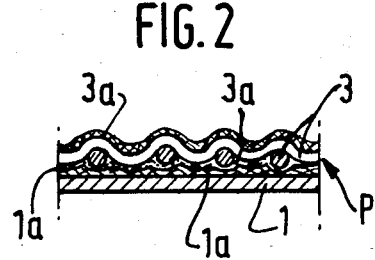
FIG. 2 is a schematic and fragmentary section of a reinforced panel according to the invention and made with the aid of the apparatus illustrated in FIG. 1.

The thus formed assembly, forming the panel P in FIG. 2 with the aid of a metallic mesh 3 of double wire thickness, laid on the metallized sheet 1 to which it is welded by way of the covering layers $1a$ and $3a$ of the metallized sheet 1 and the mesh 3, respectively, is entrained after its passage through the path B by pairs of extracting rollers E which assure the rotation of the reels of the sheeting and of the mesh with good synchronization and then the assembly traverses a final cooling chamber F before passing between rolling cylinders D and being then ready for use.

Regarding the conditions for performing the process, it may be noted that the surface treatment of the sheets 1 and 2 after unwinding has the object of placing the metallized surfaces of these sheets in a condition of cleanliness required for good diffusion, supplemented by a preheating to a temperature $T_1$. This temperature $T_1$ is to permit good welding but should not cause the metallic covering to be brought to a liquid state, the covering being generally of zinc, nor should it cause the migration of the iron in the sheet into the covering metal layer which could damage the subsequent welding by migration of the iron in the zinc and the formation of zinc-iron compounds, for example.

With regard to the mesh, the reheating temperature $T_2$ is a function of the liquid metal weld material forming the bath B. This material should be capable of readily diffusing into the metal covering of the sheet 1 to effect welding, but at a temperature which avoids the migration of iron into the covering and into the weld. The weld would in that case become defective by modification of the kinetics of diffusion.

and resistant connection between the mesh and the sheets; the obstacle encountered in the usual panels during electric welding of these panels is in this way obviated and the reinforced panels preserve all their intrinsic damping qualities and mechanical resistance as well as an excellent resistance to corrosion on their surfaces which are protected by metallization.

In the embodiment of FIG. 3 the apparatus according to the invention is designed for making sandwich panels and the same reference symbols have been used as in FIG. 1 for the elements already shown in the latter Figure and for them no additional explanation will be given.

Symmetrically about either side of the vertical plane V, this apparatus comprises two reels $B_1$ and $B_2$ of horizontal axes on which are wound in the form of strips of sheets 1 and 2 destined to constitute the external surfaces of a panel according to the invention. These sheets are metallized with a metal, or a covering alloy such as zinc by galvanization or electric zinc plating or in certain applications, with aluminum, at least on the surface which is to come into contact with the mesh.

Each reel $B_1$ and $B_2$ is respectively associated with a block $P_1$ and $P_2$ designed to assure in a manner known per se a mechanical and/or chemical preparation of the surface of the sheet strip, and a heating unit $R_1$ and $R_2$ for bringing the temperature of the respective strips to a predetermined value $T_1$.

The two strips of sheet 1 and 2 unwound from the reels $B_1$ and $B_2$ by non-illustrated means and having traversed respectively the surface treatment units and heating units $P_1$ and $R_1$, $P_2$ and $R_2$ respectively, are applied to two compression cylinders $C_1$ and $C_2$ disposed on either side of the central vertical plane V between which strips 1 and 2 are engaged according to a vertical ascending path in plane V, wherein at least their opposing surfaces have been metallized.

The mesh, treated as in the case of FIG. 1, is entrained between the sheets 1 and 2 in the cylinders $C_1$ and $C_2$. Under the effect of compression and rolling there is close contact between the mesh 3 and the sheets 1 and 2 and welding by diffusion. The thus constituted assembly forms the panel P shown in fragmentary section in FIG. 4, the panel being formed by a metallic mesh 3 with double wire thickness pressesd between two metallized sheets 1 and 2, the covering of metallization $3a$ of the mesh 3 made from a weld material being welded to the metallization coverings $1a$ and $2a$ of the sheets 1 and 2, which in other respects have metallization coverings $1b$ and $2b$ on their external surfaces. In the apparatus of FIG. 3, the sheets 1 and 2 represent a cooling mass or body which, relative to the mesh 3, is greater than in the case of FIG. 1 and accordingly the blowing nozzles 18 and 19 for cool air in FIG. 1 may be omitted.

Self-evidently, the present invention is not limited to the described and illustrated embodiments and it may be embodied in numerous variants available to a man skilled in the art without departing from the spirit of the invention and it should be understood that mutatis mutandis the solutions described with regard to FIGS. 1 and 2 may be applied to the structure and manufacture of sandwich panels according to FIGS. 3 and 4. In this case, the strip of sandwich panel may be treated in the same way as the reinforced panel, that is, with rapid cooling immediately after exit from the rolling zone 4 where, if the sheets are not rolled in the strictest sense, the rounded peripheral surfaces of the mesh 3 are at least lightly flattened by the squeezing force T. Naturally one may manufacture similar panels P having several superposed and alternating layers of sheeting 1 and mesh 3.

Similarly, to assure the metallization of the surface of the mesh 3, the bath B may be replaced by atomization of the liquid weld product. The mesh 3 may have metallization only in certain zones where it is desired to weld it to the sheet 1, the other zones providing only contact between the mesh and the sheet, for example, for vibration and noise attenuation purposes on the panel P. Equally it should be understood that it is possible to provide a temperature $T_1$ for the sheet 1 or 2 (for example, covered with aluminum) which is higher than the temperature $T_2$ of the mesh (for example, covered with zinc), in such a manner that the heat of the sheet and its covering causes a fusion of the covering of the mesh and a weld between the covering of the sheet and that of the mesh.

We claim:

1. A process for the manufacture of a reinforced panel comprising heating at least one sheet metallized on at least one surface as a preliminary step to a first predetermined temperature, covering a strip or plate of mesh in a preliminary step with a welding material by immersing into a bath of liquid metallic material, thus heating said covered mesh to a second predetermined temperature higher than the melting point of the welding material, and compressing the sheet and the mesh superimposed with their metallized surfaces in contact in such a manner as to assure the welding of the mesh to the sheet by transfer of heat from the higher temperature in order to bring simultaneously to the weld temperature, the coverings of the sheet and of the mesh, and by diffusion of said coverings into each other, wherein the sheet is metallized with zinc, and the welding material is aluminum or an aluminum alloy, whereby energy of latent heat of solidification of the aluminum welding material is utilized to effect the welding.

2. The process according to claim 1, wherein the welded assembly of the sheet and the mesh is subjected immediately after compressing the sheet and the mesh to a rapid supplementary cooling by blowing nozzles to a third predetermined temperature at which the weld is hardened.

3. The process according to claim 1, wherein the mesh has previously been metallized before immersing it into the bath of liquid metallic material with a metal other than that of the liquid metallic material.

4. The process according to claim 1, wherein the superimposed sheet and mesh are compressed between the cylinders of a calender to cause a rolling or flattening of at least the mesh and a reduction of the cross section of the superimposed sheet and mesh.

5. The process according to claim 1, wherein the superimposed sheet and mesh are compressed by means of a press.

6. The process according to claim 1, wherein the panel is formed by a metallic mesh engaged through a vertical ascending path between two sheets which are driven between the cylinders of a calender and of which at least the opposing faces are metallized, whereby said sheets constitute the external surfaces of a sandwich panel.

* * * * *